United States Patent [19]
Mott

[11] 3,982,383
[45] Sept. 28, 1976

[54] HARVESTING PLATFORM WITH A FLOATING CUTTER BAR

[75] Inventor: Roger Eugene Mott, Bettendorf, Iowa

[73] Assignee: Deere & Company, Moline, Ill.

[22] Filed: Nov. 13, 1974

[21] Appl. No.: 523,509

[52] U.S. Cl. .............................. 56/11.6; 56/12.7; 56/208; 56/DIG. 15
[51] Int. Cl.² ...................................... A01D 69/08
[58] Field of Search ............ 56/15.8, 312, 257, 181, 56/10.4, 10.2, 11.6, 12.7, 14.3, 208, 221, 296, DIG. 10, DIG. 15, 14.9, 15.2, 15.3, 207, 264

[56] References Cited
UNITED STATES PATENTS

| | | | |
|---|---|---|---|
| 2,099,471 | 11/1937 | Edgington | 56/181 |
| 2,552,623 | 5/1951 | Dye | 56/312 |
| 2,795,922 | 6/1957 | Hume | 56/257 |
| 2,850,864 | 9/1958 | Rohweder | 56/257 |
| 2,915,870 | 12/1959 | Hume | 56/208 |
| 3,242,657 | 3/1966 | Larsen et al. | 56/11.6 |
| 3,355,865 | 12/1967 | Waldrop | 56/208 |
| 3,412,535 | 11/1968 | Drummond | 56/208 |
| 3,528,231 | 9/1970 | Keller et al. | 56/11.6 |
| 3,597,907 | 8/1971 | Neal | 56/208 |
| 3,698,164 | 7/1970 | Boone et al. | 56/DIG. 15 |
| 3,699,751 | 10/1972 | Ross et al. | 56/11.6 |

Primary Examiner—Louis G. Mancene
Assistant Examiner—James D. Hamilton

[57] ABSTRACT

A self-propelled combine has a forwardly extending, vertically adjustable crop-feeding housing and a transversely elongated, cutter bar type harvesting platform mounted on the forward end of the housing. The platform includes a transversely elongated frame with a transverse flexible cutter bar disposed along the leading edge of the platform floor. The cutter bar is mounted on the platform by a plurality of transversely spaced parallel type linkages that permit independent vertical adjustment of different areas of the cutter bar so that the cutter bar is free to follow the contour of the ground. A wobble type drive mechanism is mounted on one end of the cutter bar and floats therewith, and a sheet-like spring member spans the width of the platform and has its rearward end attached to the platform floor and its forward end connected to the cutter bar, the spring member deflecting downwardly as the cutter bar swings downwardly to partially counterbalance the weight of the cutter bar, the spring member also sealing the area between the floor and the cutter bar. Structure is also provided for adjusting the cutter bar in a fore and aft direction relative to the floor to vary the distance between the cutter bar and the platform auger.

17 Claims, 5 Drawing Figures

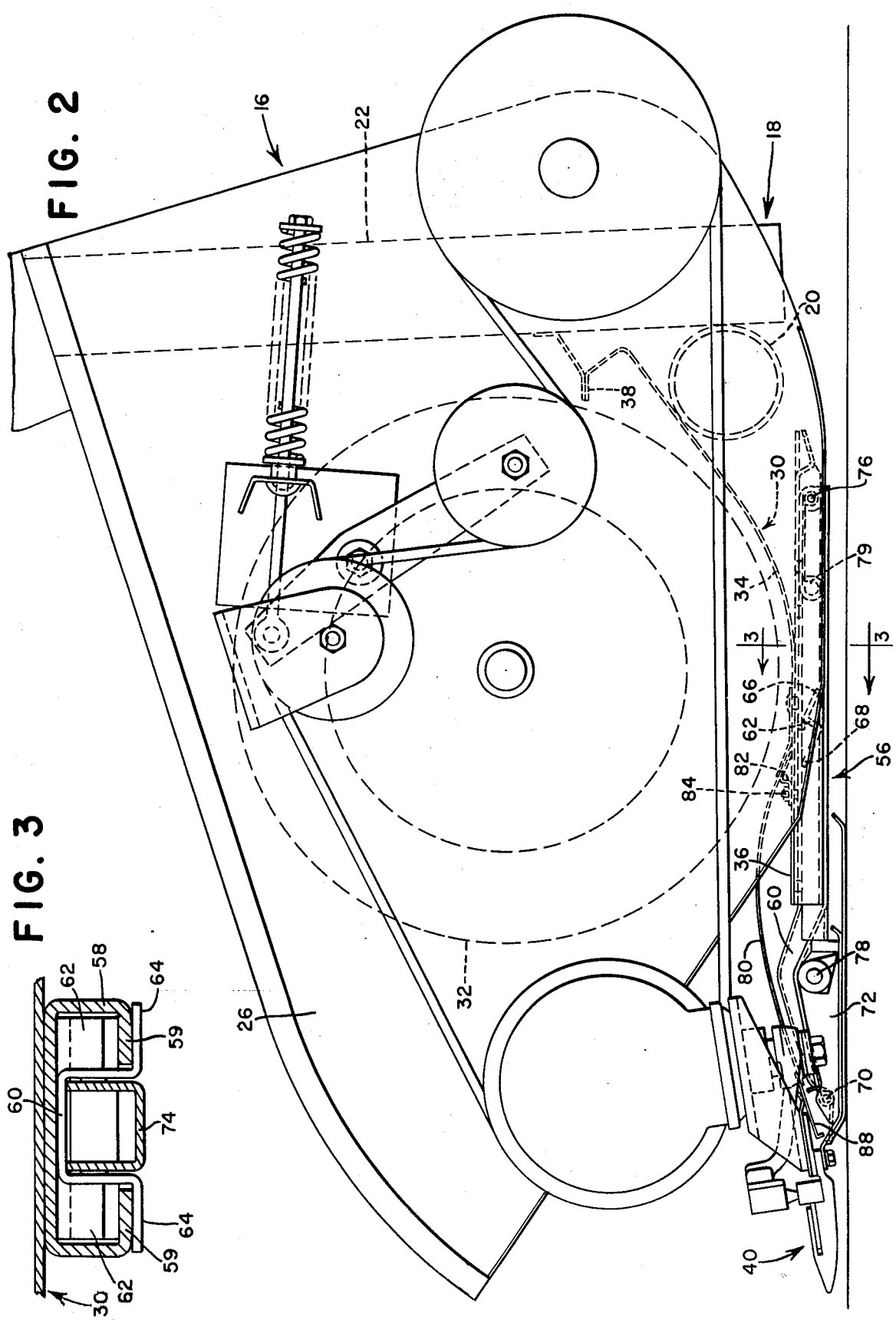

3,982,383

HARVESTING PLATFORM WITH A FLOATING CUTTER BAR

BACKGROUND OF THE INVENTION

This invention relates to an improved harvesting platform having a flexible cutter bar assembly, such as is used on a combine or the like.

Cutter bar type platforms are conventionally carried at the front of self-propelled harvesting machines, such as combines, and are transversely elongated relative to the direction of travel. The platforms are also conventionally vertically adjustable, and, when the platform is being used to harvest such crops as soybeans or the like, the platform is operated as close to the ground as possible. Such platforms conventionally include a floor with a transverse cutter bar along the leading edge of the floor. A reel is also normally provided above the cutter bar and moves the crop toward the cutter bar as the machine advances, the crop severed by the cutter bar being fed to a transverse auger which converges the crop along the floor toward the center of the platform floor for rearward discharge.

The platform floor is normally rigid; although, it is known to provide a flexible cutter bar assembly, which is free to flex in a vertical direction so that the cutter bar assembly is free to follow the contour of the ground. It is further known to mount the flexible cutter bar assembly on the platform frame by means of a number of transversely spaced fore and aft extending arms which are free to swing vertically to allow independent vertical adjustment of the different areas of the cutter bar. It is also known to provide spring means operative between the platform frame and the cutter bar assembly to partially counterbalance the weight of the cutter bar assembly to reduce the weight of the cutter bar assembly supported on the ground.

The cutter bar assembly conventionally includes a reciprocating sickle driven by a drive mechanism on one side of the platform that converts rotary motion to the reciprocating motion required by the sickle. One of the problems associated with the use of such cutter bars, of course, is the driving connection between the drive mechanism, which is normally rigid with the platform frame, and the sickle, which is free to flex in a vertical direction.

SUMMARY OF THE INVENTION

According to the present invention, an improved flexible cutter bar type harvesting platform is provided for use with combines and the like.

An important feature of the improved flexible cutter bar platform resides in the mounting of a drive mechanism for the cutter bar assembly directly on the cutter bar asembly so that the drive mechanism floats up and down with the cutter bar assembly, eliminating the necessity for a compensating mechanism between the drive mechanism and the cutter bar assembly. Also, the drive mechanism has a rotary input sheave driven by a belt drive mounted on one side of the platform, and a belt-tensioning mechanism is provided in a belt drive to compensate for the movement of the drive mechanism.

Another feature of the invention resides in the provision of a plurality of transversely spaced generally fore and aft linkages pivotally connected at their rearward ends to the platform frame and their forward ends to the cutter bar assembly, the double pivot linkages permitting the cutter bar assembly to ride in a substantially horizontal condition, regardless of the vertical position of the cutter bar assembly relative to the platform frame. More specifically, the linkages include rearward push arms, pivotally connected to the cutter bar assembly and the platform frame, and stop arms generally parallel to and forwardly of the push arms and also pivotally connected to the cutter bar assembly and swingable relative to the platform assembly, the push arms and the stop arms forming a parallel type linkage, with the stop arms limiting the movement of the cutter bar assembly relative to the platform frame.

Another feature of the invention resides in the provision of a transversely elongated, resilient, sheet-like spring element having its rearward end connected to the forward end of the floor and its forward end connected to the cutter bar assembly, the spring element functioning as a seal to close the gap between the platform and the cutter bar assembly and as a spring partly counterbalancing the weight of the cutter bar assembly to reduce the weight of the cutter bar assembly supported on the ground.

Still another feature of the invention resides in the provision of means for adjusting the cutter bar assembly in a fore and aft direction relative to the platform frame to allow the positioning of the cutter bar assembly in its optimum position relative to the platform auger for different types of crops and crop conditions. Still more specifically, the cutter bar mounting linkages are mounted on generally fore and aft support arms, which telescope in a fore and aft direction in fore and aft support members attach to the bottomm of the platform frame, means being provided for attaching the support arms in alternate fore and aft positions relative to the support members.

BRIEF DESCRIPTION OF THE DRAWINGS

FIG. 2 is an enlarged side elevation view of the platform with the cutter bar assembly in its uppermost position relative to the remainder of the platform.

FIG. 3 is an enlarged section view of the rear portion of the cutter bar assembly mounting means as viewed generally along the line 3—3 of FIG. 2.

DESCRIPTION OF THE PREFERRED EMBODIMENT

Figure 1:
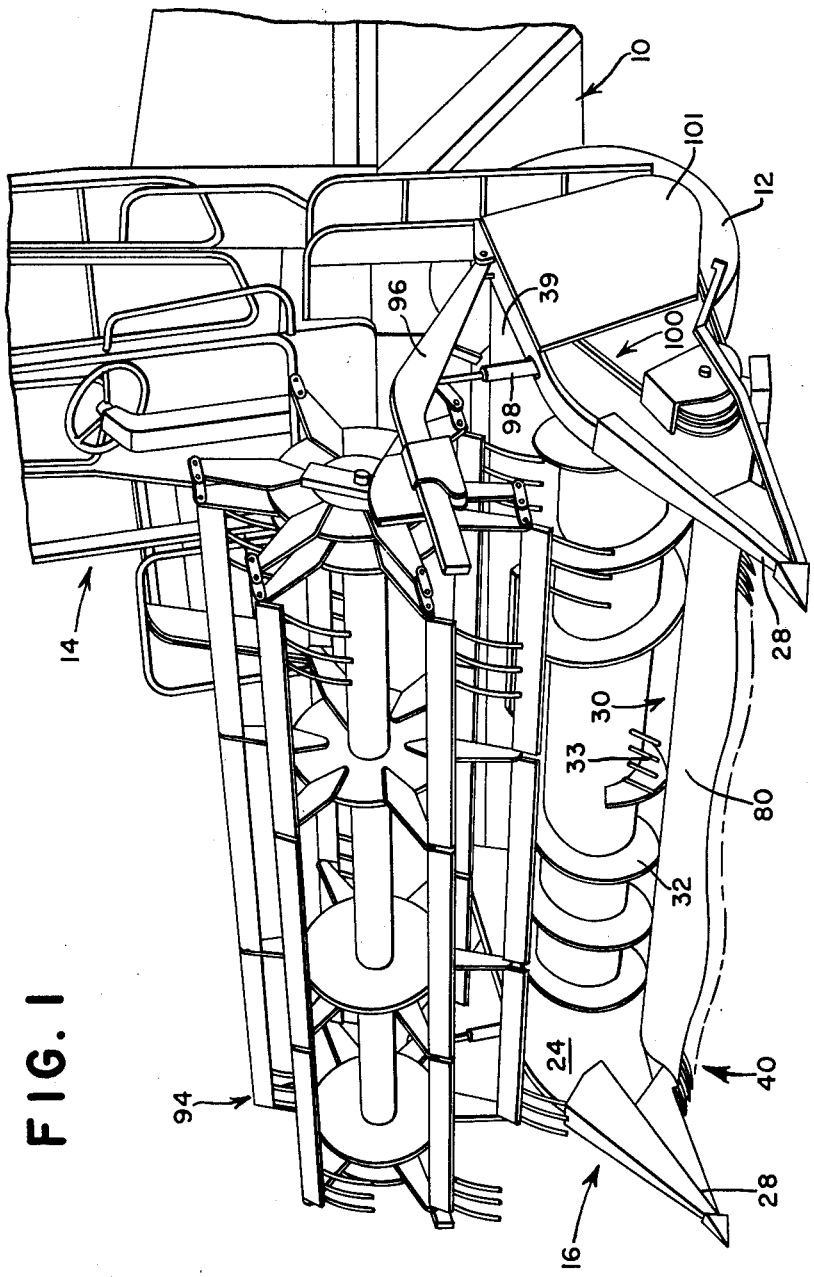
FIG. 1 is a left front perspective view of a harvesting platform embodying the invention and mounted on a self-propelled combine, only the forward portion of which is shown, the cutter bar assembly being shown in a flexed condition such as it would be during operation when riding over uneven terrain.

The invention is embodied in a self-propelled combine having a main separator body 10, only the forward portion of which is shown in FIG. 1. As is conventional, the combine is mounted on a pair of forward drive wheels 12 and has a forward, elevated operator's station 14 and a forwardly extending vertically adjustable crop feeding housing, that is not shown in detail. An improved cutter bar type platform, indicated generally by the numeral 16 is mounted on the forward end of the feeder housing for vertical adjustment therewith. As is conventional, the harvesting platform 16 removes the crop from the field, converges it, and delivers it rearwardly to the crop feeding housing, which in turn delivers it to a separating mechanism in the combine body 10.

The platform 16 includes a transversely elongated frame indicated generally by the numeral 18. The frame 18 includes a transverse tubular beam 20, that spans the width of the platform at a lower rearward portion thereof, and a plurality of upright frame members 22 extending upwardly from the tubular beam 20 on the rearward side of the platform. The platform frame also includes right and left side walls or panels 24, 26, respectively, and divider points 28 are provided along the leading edge of the right and left side panels 24 and 26. The platform also includes a floor 30 which spans the width of the platform between the right and left side panels 24 and 26 immediately above and forwardly of the tubular beam 20.

A transverse crop converging auger 32 is disposed immediately above the floor and has oppositely wound flights on its opposite ends for moving the crop toward the center of the platform, where it is fed rearwardly to the crop feeding housing by a plurality of feeder fingers 33, which are mounted on the auger 32 in a wall known manner. The platform floor includes an arcuate portion 34 generally concentric with the auger and closely adjacent to the lower rear portion thereof. The floor also includes a horizontal forward portion 36 that extends tangentially forwardly from the arcuate portion 34. An auger stripper 38 is disposed adjacent to the rearward side of the auger at the rearward end of the floor 34 at the junction of the floor with an upright rear wall 39 of the platform.

A transversely extending cutter bar assembly, indicated in its entirety by the numeral 40, spans the width of the platform between the opposite side panels 24 and 26 forwardly of the leading edge of the floor 30. The cutter bar assembly is of the flexible or floating type, wherein the cutter bar is free to flex in a vertical direction to a limited degree so that it is able to follow the contour of the ground. Such flexible cutter bars are well known and have been used on combine platforms when harvesting low lying crops, such as soybeans and the like, a typical flexible cutter bar being shown in U.S. Pat. No. 2,795,922. The cutter bar assembly 40 includes a transverse beam 42 that spans the width of the platform and is free to flex in a vertical direction, although substantially rigid in a fore and aft direction. A plurality of mower guards 44 that are mounted side by side on the beam 42 in a known manner, and a transversely reciprocal sickle bar 46 is mounted for reciprocation in the mower guards, also in a known manner.

A drive mounting bracket 48 is mounted on the left hand end of the cutter bar beam 42 adjacent the exterior side of the left side panel 26, the beam 42 extending through an opening in the side panel, and a wobble type drive mechanism 50 is mounted on the bracket 48 on the exterior side of the side panel. Wobble type drives are well known and convert rotary input motion to reciprocating output motion, only the exterior housing of the drive mechanism being shown. The drive mechanism 50 includes a rotatable input sheave 51 rotatable about a transverse axis and a reciprocating output arm 52 that reciprocates in a transverse direction about a vertical axis and is connected to the cutter bar sickel 46.

A plurality of skids 54 are attached to the cutter bar beam 42 on the underside of the mower guards 44 at transversely spaced intervals, the skids being located at approximately three foot intervals across the width of the platform. Thus, in a 15-foot platform, six skids would be provided, with a skid being located at each end of the platform. A plurality of mounting mechanisms 56 connect the cutter bar assembly 40 to the platform frame 18, the mounting mechanism being spaced at the same intervals as the skids. The mounting mechanisms permit independent vertical adjustment of different areas of the cutter bar assembly as the respective skids follow the contour of the ground. Thus, as shown in FIG. 1, one skid could be riding on a raised portion of ground, while the adjacent skid is riding in a depression, so that one portion of the cutter bar within the assembly could be raised while the adjacent portion might be in a lowered condition, giving the cutter bar a curved or sinewous configuration, such as shown in FIG. 1. Of course, stops are provided to limit the uppermost and lowermost positions of the mounting mechanisms to limit the amount of flexing of the cutter bar assembly to a degree that will not impair the operation of the cutting mechanism, the amount of flexing also being limited by the degree of flexibility of the cutter bar beam 42.

Since the mounting mechanisms 56 are identical, only a single mechanism will be described in detail. Each mechanism includes a downwardly open, fore and aft extending, general channel shaped support member 58 having inwardly extending ledges or lips 59 on its lower or open side, as best shown in FIG. 3. The channel shaped member abut the underside of the flat, forward floor portion 34 and are rigidly secured to the floor.

The mounting mechanism includes a generally fore and aft stop arm 60 that has its rearward end disposed in the channel shaped support member 58, the rearward end being provided with a pair of Z-shaped tabs 62 projecting from opposite sides of the stop arm and disposed between the top of the support member and the support member lips. The tabs maintain the rearward end of the stop arm in the channel shaped member while permitting fore and aft sliding movement of the stop arm relative thereto. The stop arm is also channel shaped and open downwardly and has a pair of outwardly extending flanges 64 along its lower sides that seat against the support member lips 59 when the stop arm is in its uppermost position parallel to the support member. The Z-shaped tabs have upper legs 66 and lower legs 68 that are parallel and inclined downwardly and rearwardly relative to the top of the stop arm. The top of the upper leg 66 and the bottom of the lower leg 68 respectively engage the top of the support member and the support member lips as the stop arm swings downwardly about its rearward end to limit the downward movment of the stop arm, the stop arm being shown in its lowermost position in FIG. 4, with the upper and lower legs of the Z-shaped tabs 62 engaging the respective portions of the support member.

The front end of the stop arm 60 is connected to the cutter bar assembly by means of a transverse front pivot 70 that is carried in a vertical bracket 72 extending upwardly from the skid 54. The mounting mechanism 56 also includes a generally fore and aft push link 74 that is mounted below and rearwardly of the stop arm 60 generally parallel thereto. The push link is U-shaped in cross section and fits into the recess of the channel shaped push link 60 when the cutter bar assembly is in its uppermost position, as shown in FIG. 2. The rearward end of the push link 74 is pivotally connected to the rearward end of the support member 58 by means of a transverse rear pivot 76, while the forward end of the push link 74 is pivotally connected to the cutter bar assembly by a transverse front pivot 78 that is carried in the vertical mounting bracket 72 rearward of the stop arm pivot 70. As is apparent, the stop arm and the push link form a parallel type linkage, that permits the cutter bar assembly to adjust vertically in a generally horizontal condition. An alternate rear push link pivot is indicated by the numeral 79 and provides a means for mounting the mounting mechanism in an alternate fore and aft position relative to the support member 58, thereby permitting adjustment of the cutter bar assembly between alternate fore and aft positions relative to the remainder of the platform to optimize the distance between the cutter bar assembly and the platform auger 32.

A transversely elongated, resiliently flexible, sheet-like spring element 80 spans the width of the platform and extends between the forward level portion 36 of the floor and the cutter bar assembly 40. The rearward end of the spring element 80 is provided with an attaching flange 82 that is attached to the forward end of the floor by a plurality of fasteners 84 extending through the attaching flange and bores 86 in the floor. As is apparent, an alternate set of bores 86 are provided forwardly of the bores 86 wherein the fasteners are shown as mounted in the drawings to provide an alternate connection point for the spring element to the floor, to thereby accommodate the adjustment of the cutter bar assembly into its alternate, forward position. The front end of the spring element 80 is provided with a hook portion 88 that extends through a transversely elongated slot 90 formed between a top member 91 attached to and extending rearwardly from the beam 42 and an arcuate lower member 92 attached to and extending rearwardly from the lower side of the guards 44. As is apparent, the forward end of the spring element is free to slide in and out of the slot 90, providing a lost motion connection between the spring element and the cutter bar assembly to accommodate the vertical adjustment of the cutter bar assembly relative to the platform floor. As is also apparent, the forward end of the spring element deflects downwardly as the cutter bar assembly adjust downwardly to follow the contour of the ground and functions as a leaf spring to exert an upward force on the cutter bar assembly, the force counterbalancing part of the weight of the cutter bar assembly to reduce the weight of the cutter bar assembly supported on the ground via the skids 54. The spring element also functions as a forward extension of the floor to cover the gap between the cutter bar assembly and the floor, providing a smooth transition for the crop material flowing over the cutter bar to the rigid portion of the floor while preventing the loss of material between the cutter bar assembly and the platform floor. While the spring element is shown as a single, transversely elongated member, the element could obviously be formed by a number of side by side members.

A pick-up type harvester reel 94 spans the width of the platform above the cutter bar assembly in the conventional manner, the reel being mounted on a pair of vertically adjustable, forwardly extending arms 96 at opposite ends of the platform. The arms 96 are adjustable in a vertical direction by means of reel lift cylinders 98 at opposite ends of the platform to vary the height of the reel, and means are also provided for mounting the reel on the arms at alternate fore and aft locations, to vary the fore and aft position of the reel, it being well known construction to optimize the location of the reel relative to the cutter bar assembly according to the crop and crop conditions.

The wobble drive mechanism 50 is driven by a belt drive 100 on the left side 26 of the platform, the drive 100 being partially shielded by a shield 101. The drive 100 includes a drive sheave 102 mounted on a transverse drive shaft 104 along the rear side of the platform, the drive shaft being driven from the combine in a conventional fashion. A drive belt 106 is trained around the drive sheave 102 and the input sheave 51 of the wobble drive mechanism 50, and an idler mechanism 108 is proivided to provide proper belt tension regardless of the position of the cutter bar assembly and the drive mechanism mounted thereon. The idler mechanism 108 includes a fixed idler 110 that engages the inside of the belt 106, the movable idler 112 being mounted on one end of a swingable arm 114. A generally fore and aft helical compression spring 116 exerts a rearward force on a fore and aft link 118 extending through the spring, the forward end of the spring being anchored on a bracket 120 attached to the platform side panel 26. The forward end of the link 118 is connected to the opposite end of the arm 114 from the movable idler, exerting a clockwise force on the arm that biases the idler against the back side of the belt 106.

In operation, when the platform is being operated in low lying crops such as soybeans, the platform advances with the cutter bar assembly 40 riding close to the ground, the skids 54 riding along the ground. The cutter bar is sufficiently flexible that it generally follows the contour of the ground, the mounting mechanism 56 allowing independent vertical adjustment of the different portions of the cutter bar assembly supported by their respective mounting mechanisms. The vertical flexing of the cutter bar is limited by the amount of flexibility in the cutte bar beam and is further limited by the mounting mechanism 56.

Figure 4:
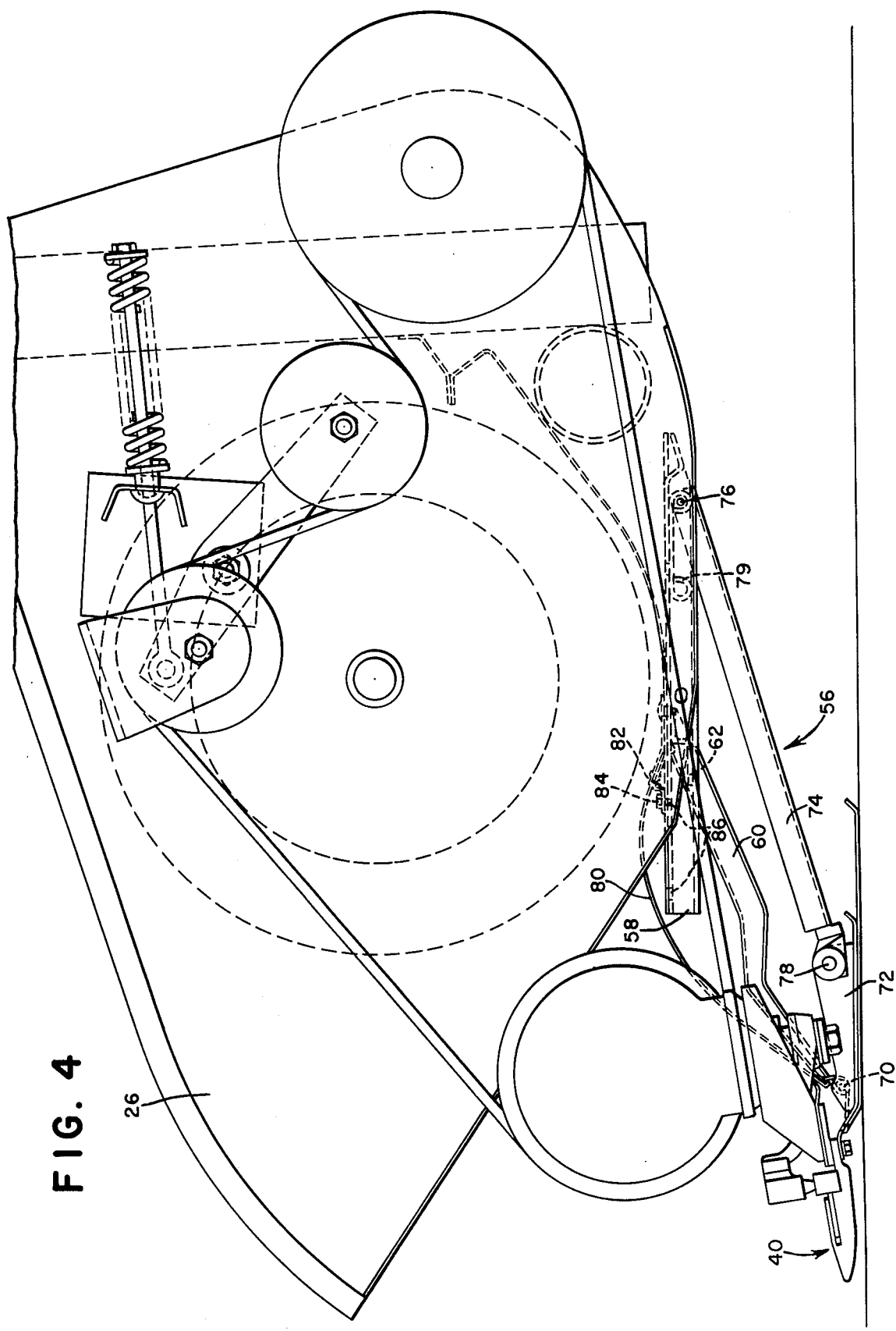
FIG. 4 is an enlarged side elevation view of the platform similar to FIG. 2, but showing the cutter bar assembly in its lowermost position relative to the platform floor.
Figure 5:
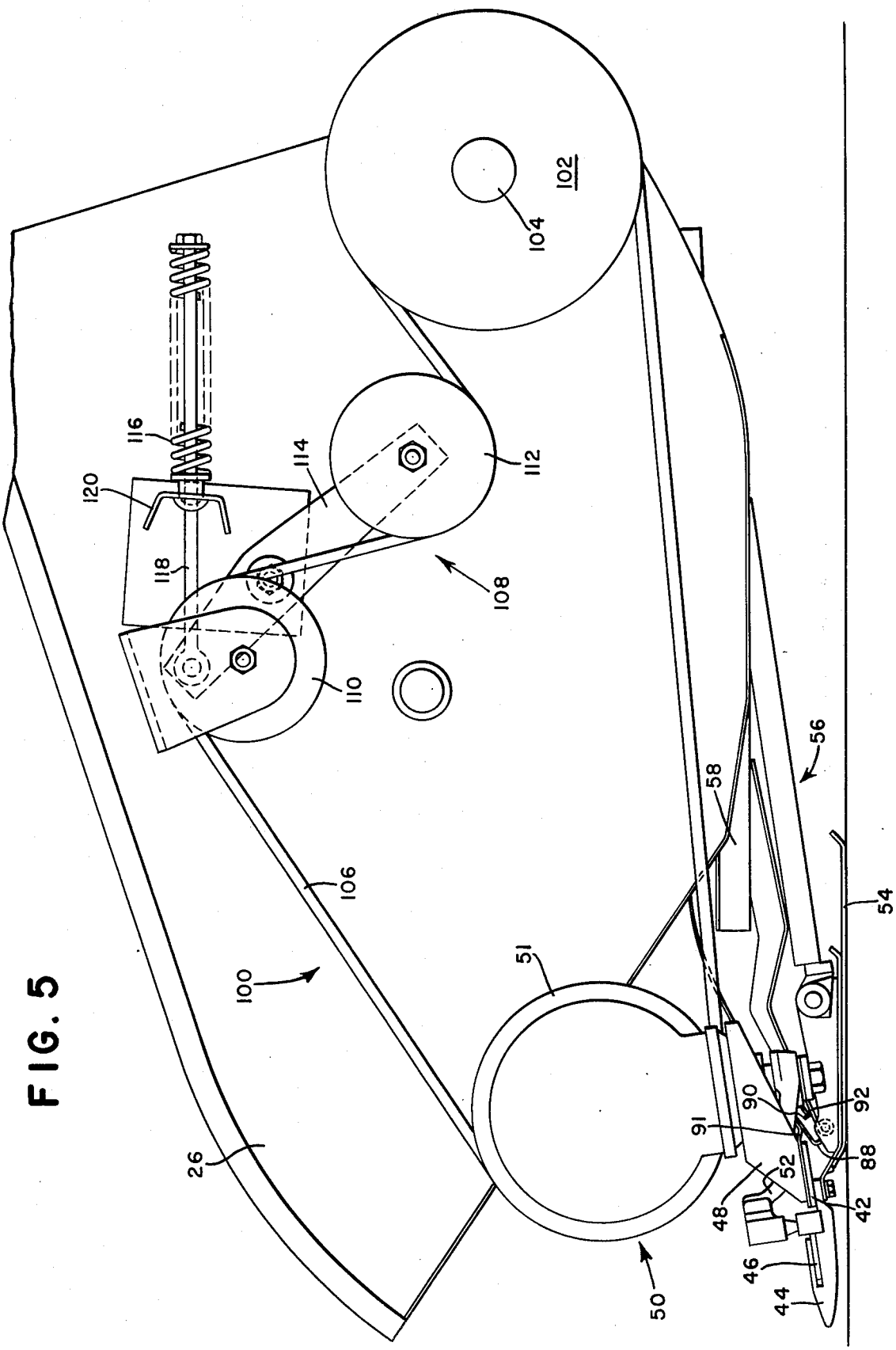
FIG. 5 is a side elevation view similar to FIG. 4, but showing the cutter bar assembly in an intermediate vertical position.

The cutter bar assembly 40 is shown in its uppermost position relative to the remainder of the platform in FIG. 2. In the upper position, the top of the stop arm 60 abuts the inside of the channel shaped member 58 so that additional upward movement is impossible. As previously described, as the cutter bar assembly drops relative to the rest of the platform, the stop arm 60 rocks about its rearward end until the Z-shaped tabs 62 abut the top of the support member and the support member lips, as shown in FIG. 4, at which time further downward movement of the stop arm 60 is impossible. As also previously described, the spring element 80 flexes as the cutter bar assembly swings downwardly, partially counterbalancing the weight of the cutter bar assembly.

I claim:

1. A harvesting platform for a mobile harvesting machine comprising: a transversely elongated platform frame having opposite sides; a platform floor extending between the opposite sides; a transverse flexible cutter bar assembly including a reciprocatable sickle, extending between the opposite sides forwardly of the floor and operative to flex vertically to a limited degree to follow the contour of the ground; means mounting the cutter bar assembly on the platform frame for vertical adjustment relative thereto so that the cutter bar assembly follows the contour of the ground; a drive mechanism having a rotary input element and a reciprocating output element drivingly connected to the sickle, the drive mechanism being mounted on one end of the cutter bar assembly for vertical adjustment therewith, and a belt drive means mounted on one side of the platform frame on the same side of the platform as the drive mechanism and operatively connected thereto, said belt drive means including belt tensioning means operative to to provide belt tension regardless of the vertically adjusted position of the drive mechanism relative to the platform frame.

2. The invention defined in claim 1 wherein the means mounting the cutter bar assembly on the platform frame includes a plurality of transversely spaced linkages, each linkage including a generally fore and aft push link having its rearward end pivotally connected to the platform frame through an axially transverse pivot and its forward end connected to the cutter bar assembly by an axially transverse pivot, so that the cutter bar swings vertically in a vertical arc about the rear pivots and is free to tilt to a limited degree about the forward pivots.

3. The invention defined in claim 2 and including a transversely elongated, resiliently flexible sheet-like spring means having its rearward end rigidly attached to the platform floor and its forward end connected to the cutter bar assembly, the forward end of the spring means deflecting downwardly as the cutter bar assembly swings downwardly to follow the contour of the ground, so that the spring means exerts an upward force on the cutter bar assembly partially counterbalancing the weight of the cutter bar assembly.

4. The invention defined in claim 3 wherein the spring means substantially spans the width of the platform and seals the gap between the forward end of the platform floor and the cutter bar assembly.

5. The invention defined in claim 3 wherein the means mounting the cutter bar assembly on the platform frame includes a plurality of generally fore and aft support members disposed below and connected to the floor, the linkages being connected to the support members in alternate fore and aft positions to selectively vary the fore and aft position of the cutter bar assembly.

6. The invention defined in claim 1 and including a transversely elongated, resiliently flexible sheet-like spring means having its rearward end rigidly attached to the platform floor and its forward end connected to the cutter bar assembly, the forward end of the spring means deflecting downwardly as the cutter bar assembly swings downwardly to follow the contour of the ground, so that the spring means exerts an upward force on the cutter bar assembly partially counterbalancing the weight of the cutter bar assembly.

7. The invention defined in claim 6 wherein the spring means substantially spans the width of the platform and seals the gap between the forward end of the platform floor and the cutter bar assembly.

8. The invention defined in claim 6 wherein the means mounting the cutter bar assembly on the platform frame includes a plurality of generally fore and aft support members connected to and disposed below the floor and a plurality of vertically adjustable linkage means operatively connected to the support members in alternate fore and aft positions and vertically adjustably carrying the cutter bar assembly.

9. A harvesting platform for a mobile harvesting machine comprising: a transversely elongated platform frame having opposite sides; a platform floor extending between the opposite side; a transverse flexible cutter bar assembly extending between the opposite sides forwardly of the floor and operative to flex vertically to a limited degree to follow the contour of the ground; linkage means mounting the cutter bar assembly on the platform frame for vertical adjustment relative thereto so that the cutter bar assembly is free to follow the contour of the ground; and a transversely elongated, resiliently flexible, sheet-like spring means having its rearward end rigidly attached to the platform floor and its forward end connected to the cutter bar assembly, the forward end of the spring means deflecting downwardly as the cutter bar simply swings downwardly to follow the contour of the ground, so that the spring means exerts an upward force on the cutter bar assembly partially counterbalancing the weight of the cutter bar assembly.

10. The invention defined in claim 9 wherein the spring means comprises a single pan like element that substantially spans the width of the platform and seals the gap between the forward end of the platform floor and the cutter bar assembly.

11. The invention defined in claim 10 wherein the means mounting the cutter bar assembly on the platform frame includes a plurality of generally fore and aft support members disposed below the floor and linkage means operatively connected to the support members in alternate fore and aft positions and vertically adjustably carrying the cutter bar assembly.

12. A harvesting platform for a mobile harvesting machine comprising: a transversely elongated platform frame having opposite sides; a platform floor extending between the opposite sides; a transverse flexible cutter bar assembly extending between the opposite sides forwardly of the floor and operative to flex vertically to a limited degree to follow the contour of the ground; a plurality of generally fore and aft support members connected to the frame and disposed below the floor; and linkage means connecting the support members to the cutter bar assembly for permitting independent vertical adjustment of different portions of the cutter bar assembly so that the cutter bar assembly follow the contour of the ground and including means operatively connecting the linkage means to the support members at alternate fore and aft positions to selectively vary the fore and aft positions of the cutter bar assembly relative to the platform frame.

13. The invention defined in claim 12 wherein the linkage means includes a plurality of transversely spaced linkages, each linkage including a generally fore and aft push link having its rearward end pivotally connected to the platform frame through an axially transverse pivot and its forward end connected to the cutter bar assembly by an axially transverse pivot, so that the cutter bar swings vertically in a vertical arc about the rear pivots and is free to tilt to a limited degree about the forward pivots.

14. A harvesting platform for a mobile harvesting machine comprising: a transversely elongated platform frame having opposite sides; a platform floor extending between the opposite sides; a transverse flexible cutter bar assembly extending between oppposite sides forwardly of the floor and operative to flex vertically to a limited degree to follow the contour of the ground; a plurality of transversely spaced linkages operatively mounting the cutter bar assembly on the platform frame for independent vertical adjustment of different portions of the cutter bar relative to the platform frame so that the cutter bar assembly is free to follow the contour of the ground, each linkage including a generally fore and aft push link having its rearward end pivotally connected to the platform frame through an axially transverse pivot and its forward end connected to the cutter bar assembly by an axially transverse pivot and a generally fore and aft stop arm generally parallel to and forwardly of the push link, the forward and rearward ends of each stop arm being respectively rockably connected to the platform frame and the cutter bar assembly for swinging about transverse axes to form a parallel type linkage with the push links whereby the cutter bar swings vertically in a vertical arc in a generally horizontal condition.

15. The invention defined in claim 14 wherein each stop arm is engageable with its associated push link to limit the upward movement of the linkage and thereby limit the upward movement of the cutter bar assembly.

16. The invention defined in claim 14 wherein each stop arm includes abutment means engageable with its associated push link, to limit the downward movement of the linkage and thereby limit the downward movement of the cutter bar assembly.

17. The invention defined in claim 14 and including a transversely elongated, resiliently flexible sheet-like spring means having its rearward end rigidly attached to the platform floor and its forward end connected to the cutter bar assembly, the forward end of the spring means deflecting downwardly as the cutter bar assembly swings downwardly to follow the contour of the ground, so that the spring means exerts and upward force on the cutter bar assembly partially counterbalancing the weight of the cutter bar assembly.

* * * * *

REEXAMINATION CERTIFICATE (436th)
United States Patent [19]
Mott

[11] B1 3,982,383
[45] Certificate Issued  Dec. 17, 1985

[54] HARVESTING PLATFORM WITH A FLOATING CUTTER BAR

[75] Inventor: Roger E. Mott, Bettendorf, Iowa

[73] Assignee: Deere & Company, Moline, Ill.

Reexamination Request:
No. 90/000,715, Jan. 25, 1985

Reexamination Certificate for:
Patent No.: 3,982,383
Issued: Sep. 28, 1976
Appl. No.: 523,509
Filed: Nov. 13, 1974

[51] Int. Cl.⁴ .......................................... A01D 69/08
[52] U.S. Cl. ................................... 56/11.6; 56/15.8; 56/15.9; 56/208; 56/15.2; 56/12.7; 56/DIG. 15
[58] Field of Search .................. 56/15.8, 15.9, 15.2, 56/15.3, 208, 158

[56]  References Cited
U.S. PATENT DOCUMENTS

| | | |
|---|---|---|
| 972,852 | 10/1910 | Guzowski . |
| 1,347,733 | 7/1920 | Davis . |
| 1,451,140 | 4/1923 | Brown . |
| 2,120,671 | 6/1938 | Jensen et al. ............................ 56/25 |
| 2,139,927 | 12/1938 | Bane ...................................... 56/158 |
| 2,245,447 | 6/1941 | Simpson ................................. 56/25 |
| 2,280,021 | 4/1942 | Askue ............................... 74/242.11 |
| 2,459,379 | 1/1949 | Hanson ............................. 74/242.11 |
| 2,523,166 | 9/1950 | Tom .................................... 56/26.5 |
| 2,599,438 | 6/1952 | Downing et al. ...................... 56/158 |
| 2,651,162 | 9/1953 | Whisler ................................. 56/60 |
| 2,674,837 | 4/1954 | Buck ..................................... 56/26 |
| 2,835,133 | 5/1958 | Rogers et al. ........................... 74/60 |
| 2,847,814 | 8/1958 | Weaver .................................. 56/27 |
| 3,043,076 | 7/1962 | Scheidenhelm ....................... 56/192 |
| 3,054,299 | 9/1962 | Procter ............................. 74/242.11 |
| 3,402,540 | 9/1968 | Karlsson .............................. 56/208 |

FOREIGN PATENT DOCUMENTS 42974  3/1960  Poland .

OTHER PUBLICATIONS

Allis-Chalmers Form TM-91 Forage Harvester.
Allis-Chalmers Form 567344 Operator's Manual Model 782 Forage Harvester.

*Primary Examiner*—Jay N. Eskovitz

[57]  ABSTRACT

A self-propelled combine has a forwardly extending, vertically adjustable crop-feeding housing and a transversely elongated, cutter bar type harvesting platform mounted on the forward end of the housing. The platform includes a transversely elongated frame with a transverse flexible cutter bar disposed along the leading edge of the platform floor. The cutter bar is mounted on the platform by a plurality of transversely spaced parallel type linkages that permit independent vertical adjustment of different areas of the cutter bar so that the cutter bar is free to follow the contour of the ground. A wobble type drive mechanism is mounted on one end of the cutter bar and floats therewith, and a sheet-like spring member spans the width of the platform and has its rearward end attached to the platform floor and its forward end connected to the cutter bar, the spring member deflecting downwardly as the cutter bar swings downwardly to partially counterbalance the weight of the cutter bar, the spring member also sealing the area between the floor and the cutter bar. Structure is also provided for adjusting the cutter bar in a fore and aft direction relative to the floor to vary the distance between the cutter bar and the platform auger.

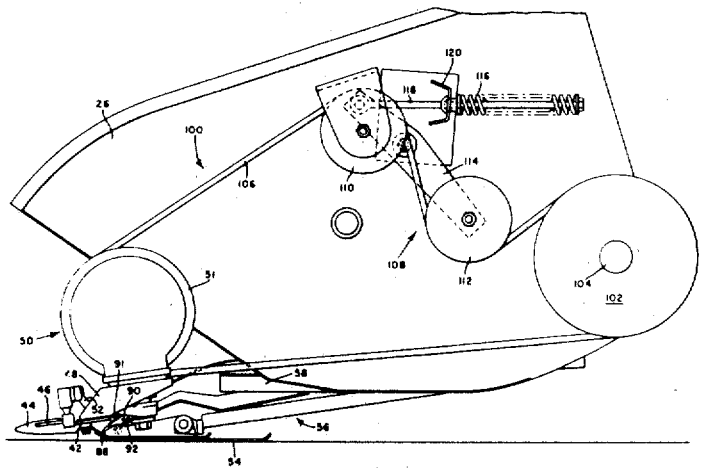

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

1. A harvesting platform for a mobile harvesting machine comprising a transversely elongated platform frame having opposite sides; a platform floor extending between the opposite sides; a transverse flexible cutter bar assembly including a reciprocatable sickle, extending between the opposite sides forwardly of the floor and operative to flex vertically to a limited degree to follow the contour of the ground; means mounting the cutter bar assembly on the platform frame for vertical adjustment relative thereto so that the cutter bar assembly follows the contour of the ground; a drive mechanism having a rotary input element and a reciprocating output element drivingly connected to the sickle, the drive mechanism being mounted on one end of the cutter bar assembly for vertical adjustment therewith, and a belt drive means mounted on one side of the platform frame on the same side of the platform as the drive mechanism and operatively connected thereto, said belt drive means including belt tensioning means operative to to provide belt tension regardless of the vertically adjusted position of the drive mechanism relative to the platform frame.

* * * * *